United States Patent
Li

(10) Patent No.: US 8,081,693 B2
(45) Date of Patent: Dec. 20, 2011

(54) GUARD INTERVAL LENGTH SELECTION IN AN OFDM SYSTEM BASED ON COHERENCE BANDWIDTH OF THE CHANNEL

(75) Inventor: Pen Li, San Jose, CA (US)

(73) Assignee: NXP B.V., Eindhoven (NL)

( * ) Notice: Subject to any disclaimer, the term of this patent is extended or adjusted under 35 U.S.C. 154(b) by 654 days.

(21) Appl. No.: 12/281,417

(22) PCT Filed: Feb. 24, 2007

(86) PCT No.: PCT/IB2007/050596
§ 371 (c)(1),
(2), (4) Date: Sep. 20, 2008

(87) PCT Pub. No.: WO2007/099486
PCT Pub. Date: Sep. 7, 2007

(65) Prior Publication Data
US 2009/0080555 A1 Mar. 26, 2009

Related U.S. Application Data

(60) Provisional application No. 60/778,514, filed on Mar. 1, 2006.

(51) Int. Cl.
*H04K 1/10* (2006.01)
*H04L 27/28* (2006.01)
(52) U.S. Cl. .................................................... 375/260
(58) Field of Classification Search .............. 370/208, 370/343, 479, 206, 324, 22, 9; 375/324, 375/261
See application file for complete search history.

(56) References Cited

U.S. PATENT DOCUMENTS

2003/0086371 A1* 5/2003 Walton et al. ................. 370/235
2003/0090994 A1 5/2003 Kakura

OTHER PUBLICATIONS

Moraitis et al. (Delay Spread Measurement and Charcterization in a special propagation environment for PCS Microcells, 2002,IEEE.*
Zhang Zhao-yang et al., A Novel OFDM Transmission Scheme with Length-Adaptive Cyclic Prefix, Nov. 2003, Journal of Zhejiang niversity Science, ISSN 1009-3095.*
Moraitis, Delay Spread Measurements and Charcterization in a Special Propagation Environment for PCS Microcells, 2002, IEEE.*
Zhang, A Novel OFDM Transmission Scheme With Length-Adaptive Cyclic Prefix, 2004, Journal of Zhejiang University Science.*
Zhang Zhao-Yang; "A Novel OFDM Transmission Scheme With Length-Adaptive Cyclic Prefix". Journal of Zhejiang University. Science, Zhejiang University Press, Hangzhou, CN, vol. 5, No. 11, Jul. 7, 2003, pp. 1336-1342.
Fitton M P et al; "A Comparison of RMS Delay Spread and Coherance Bandwidth for Characterisation of Wideband Channels". Proceedings of the 1996 IEE Colloquium on Propagation Aspects of Future Mobile Systems. Oct. 5, 1996, pp. 9/1-9/6.
Steele, R.; "Mobile Radio Communications", IEEE Press, 1994.

* cited by examiner

*Primary Examiner* — David C. Payne
*Assistant Examiner* — Wednel Cadeau

(57) ABSTRACT

A system, apparatus and methods are described that select a guard interval length (345) for a multi-path communications channel. In one embodiment, the guard interval length is selected based on a relationship between a selected coherence bandwidth (335) and a RMS delay (340) of the communication channel.

18 Claims, 6 Drawing Sheets

510

520

GUARD INTERVAL LENGTH SELECTION IN AN OFDM SYSTEM BASED ON COHERENCE BANDWIDTH OF THE CHANNEL

The present invention relates generally to wireless communication technology, and more particularly, to the determination of a guard interval length based on frequency correlation characteristics within a wireless channel.

The importance of wireless communication and its application to numerous different markets is well understood. Wireless technology and devices are continually being improved to include new features and functionality that enables a user to communicate, both voice and data, more effectively. One such feature, WLAN communication, is being integrated into a number of different wireless devices including cellular phones, smart phones and personal data assistants ("PDAs").

Wireless devices may communicate with each other in both a point-to-point connection or on a networked connection, such as a wireless local area network ("WLAN"). A WLAN access point operates as a gateway on a network and allows the wireless device to communicate with other devices on the network. This communication oftentimes requires that the communication channel between the devices conform to a particular standard of communication, such as the IEEE 802.11 standards. In order to establish a communication channel, the wireless device and/or access point analyze the channel in order to define certain communication characteristics.

This communication channel may employ orthogonal frequency division multiplexing ("OFDM") which transmits data over a number of different carriers within the channel. OFDM systems are characterized as having high spectral efficiency and good resiliency to RF interference. OFDM channels are multi-path resulting in signal distortions which may be caused by a number of factors including spatial variations in temperature, pressure, humidity, etc. that cause variations in the index of reflection as well as the reflection of signals off of various objects. Because wireless LAN environments are essentially multi-path fading channels, groups of frequencies may be attenuated and rotated in phase within the frequency domain, and adjacent symbols may smear into each other in the time domain. This type of interference is called inter symbol interference.

OFDM addresses inter symbol interference by inserting a guard interval to each symbol. The guard interval is typically a periodic extension of the OFDM symbol but conveys no new information. The guard interval is intended to prevent smearing between symbols caused by the multi-path channel.

However, the use of guard interval causes data rate inefficiencies. As the length of the guard interval increases, more time is dedicated to the guard interval instead of conveying new data. On the other hand, if the guard length interval is too small, than multi-path distortion caused by inter symbol interference may become too large and cause problems at an OFDM receiver.

A system, device and method for selecting a guard interval length is described. The invention provides an efficient manner of selecting a guard interval length for an OFDM channel by performing a number of the operations within the frequency domain. In particular, a minimum guard interval length is identified by using a relationship between a signal's coherence bandwidth and RMS delay.

A wireless device receiving an OFDM signal typically transforms the signal into the frequency domain. One method in which the transformation may be performed is by applying a Discrete Fourier Transform to the signal.

A coherence bandwidth is determined for the wireless channel using the OFDM signal. In one embodiment, the coherence bandwidth may be determined using frequency correlation characteristics of the OFDM signal. A RMS delay is then estimated using the determined coherence bandwidth according to an inversely proportional relationship between the RMS delay and the coherence bandwidth. This estimation effectively maps the metrics from the frequency domain into the time domain, where the metric of guard interval length resides. A scaling factor may be applied in the estimation process that depends on the determined coherence bandwidth of the signal.

A guard interval length is identified using the RMS delay. In particular, a minimum guard interval length is determined according to the channel RMS delay. Thereafter, an appropriate guard interval length above this minimum length is selected and used within the OFDM signal.

Reference will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

A system, apparatus and method is described for identifying a guard interval length that may be used within an OFDM system. In one embodiment of the invention, a received signal is converted into the frequency domain and corresponding frequency covariance function is calculated for the carriers within the signal. Using the frequency covariance function, a frequency correlation for the carriers within the signal is identified. A coherence bandwidth is determined by applying a first threshold value to the signal's frequency correlation.

A root mean square ("RMS") delay, within the time domain, may be estimated for the wireless channel using the previously determined coherence bandwidth according to an inversely proportional statistical relationship between coherence bandwidth and RMS delay. Using the RMS delay, a minimum guard interval length for the OFDM signal is identified. In one embodiment, the actual guard interval length may be determined by comparing the identified minimum guard interval length to a plurality of lengths defined by a standard. The most efficient guard interval length that is longer than the identified minimum guard interval length is selected.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be incorporated in a number of different wireless devices including wireless access points, wireless routers, cellular phones, smart phones and PDAs. The present invention may be integrated within these wireless devices as hardware, software or firmware. Accordingly, structures and devices shown below in block diagram are illustrative of specific embodiments of the invention and are meant to avoid obscuring the invention. Furthermore, connections between components and/or modules within the figures are not intended to be limited to direct connections. Rather, data between these components and modules may be modified, re-formatted or otherwise changed by intermediary components and modules.

Reference in the specification to "one embodiment", "another embodiment" or "an embodiment" means that a particular feature, structure, characteristic, or function described in connection with the embodiment is included in at least one embodiment of the invention. The appearances of the phrase "in one embodiment" in various places in the specification are not necessarily all referring to the same embodiment.

A. System Overview

Figure 1:
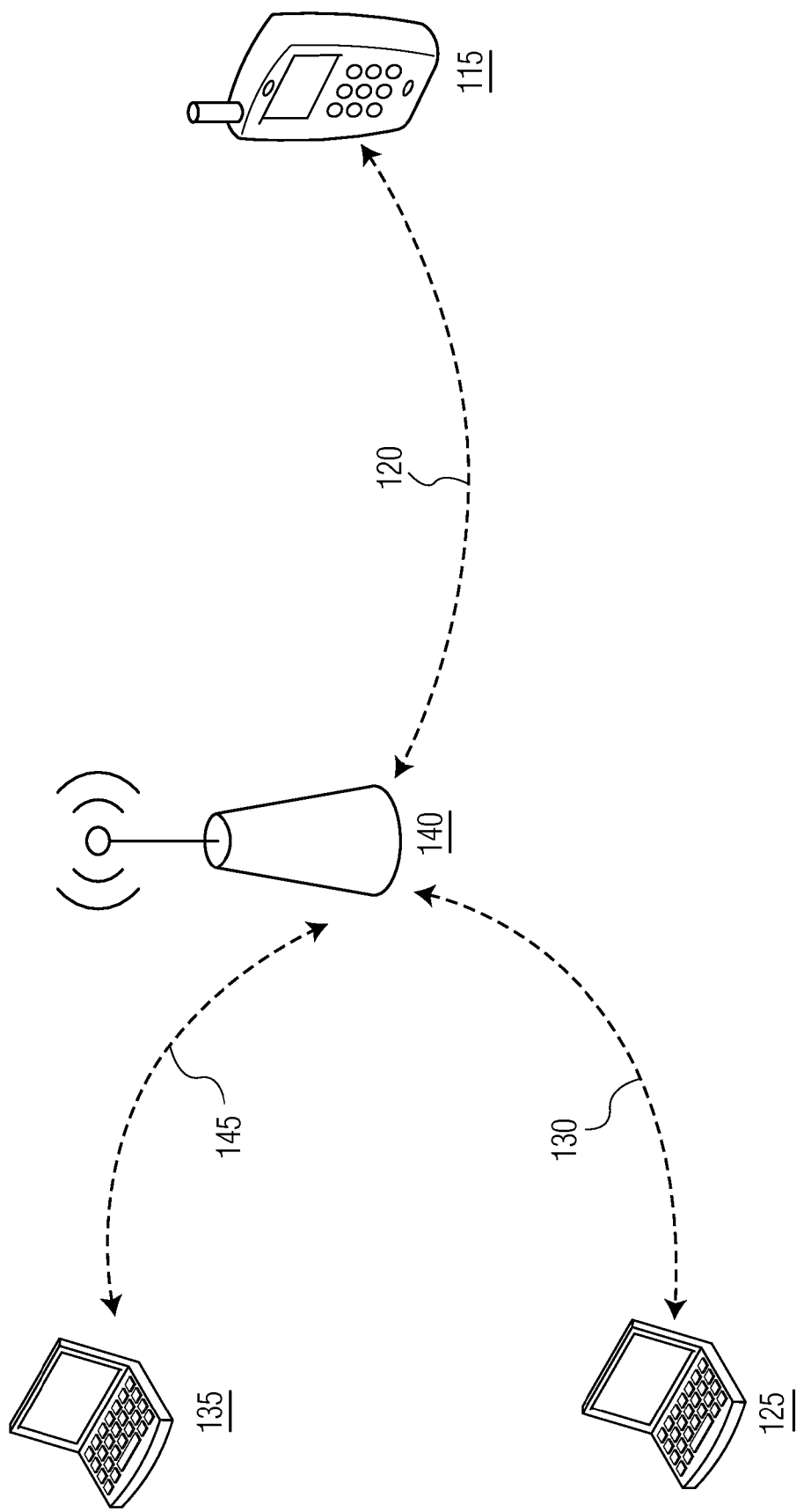
FIG. 1 is an illustration of a WLAN including an access point with which a wireless device may communicate according to one embodiment of the invention.

FIG. 1 illustrates a WLAN, having an access point, in which a plurality of wireless devices may communicate. The WLAN includes a wireless access point 140, a plurality of network stations which may include computers 125, 135 and a mobile wireless device 115 such as a cellular telephone. The wireless access point 140 may include a network switch or router.

The wireless access point 140 and other devices 115, 125, 135 communicate with each other using wireless multi-path channels 120, 130, 145, such as OFDM channels. An OFDM channel is a multi-carrier channel in which data is transmitted on multiple frequencies. The signal structure within these channels 120, 130, 145 may be adjusted according to the environment and channel characteristics in which the communication is to occur. For example, a certain communication channel may have a large amount of inter symbol interference caused by multi-path reflection. In such a scenario, the devices communicating on this channel would need to address this multi-path distortion caused by this reflection.

Figure 2:
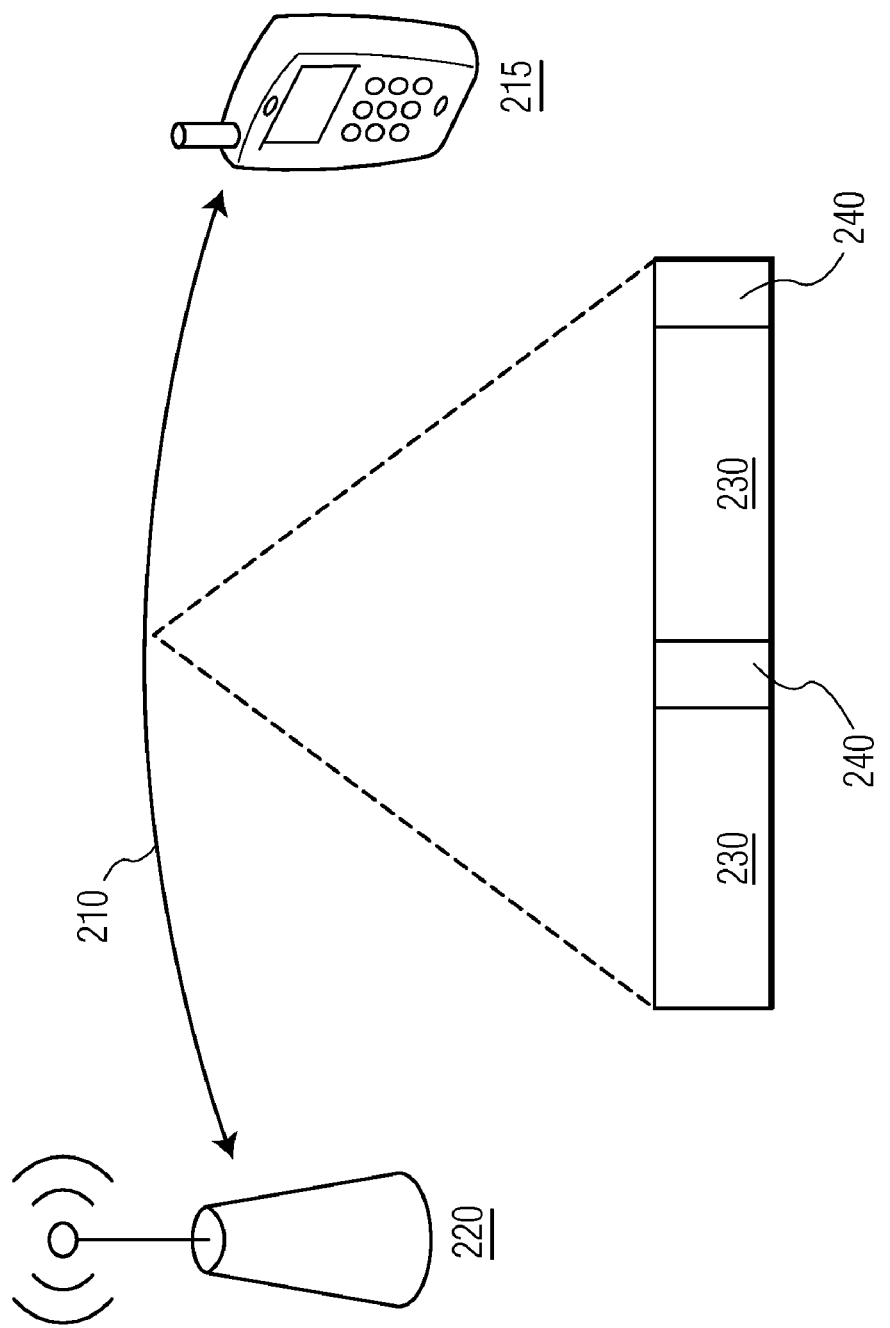
FIG. 2 is a diagram of a wireless channel including a data frame and guard interval according to one embodiment of the invention.

FIG. 2 illustrates an exemplary signal structure in an OFDM channel. In one example, a WLAN access point 220 communicates with a mobile wireless device 215 via an OFDM signal 210. Data may be transmitted and received on this channel 210 according to a particular format or structure. In one particular instance, data frames 230 containing symbols are separated by guard intervals 240. The guard symbol 240 may be a periodic or cyclic extension of the symbol within the data frame 230.

Typically, the guard intervals 240 may be ignored by a receiver because there is not any new data enclosed therein. The receiver discards the guard interval in order to remove any inter symbol interference within the channel 210. One skilled in the art will recognize the importance of maintaining the distance of the guard interval 240 to be greater than any potential smearing caused by the multi-path channel 120.

The discarding of the guard interval 240 effectively reduces the performance of the OFDM system by effectively using a portion of the signal that is not used to convey new data. Accordingly, it is important to maintain a sufficiently long guard interval to avoid symbol smearing; however, this guard interval length may reduce the performance of the system in other communication aspects.

Figure 3:
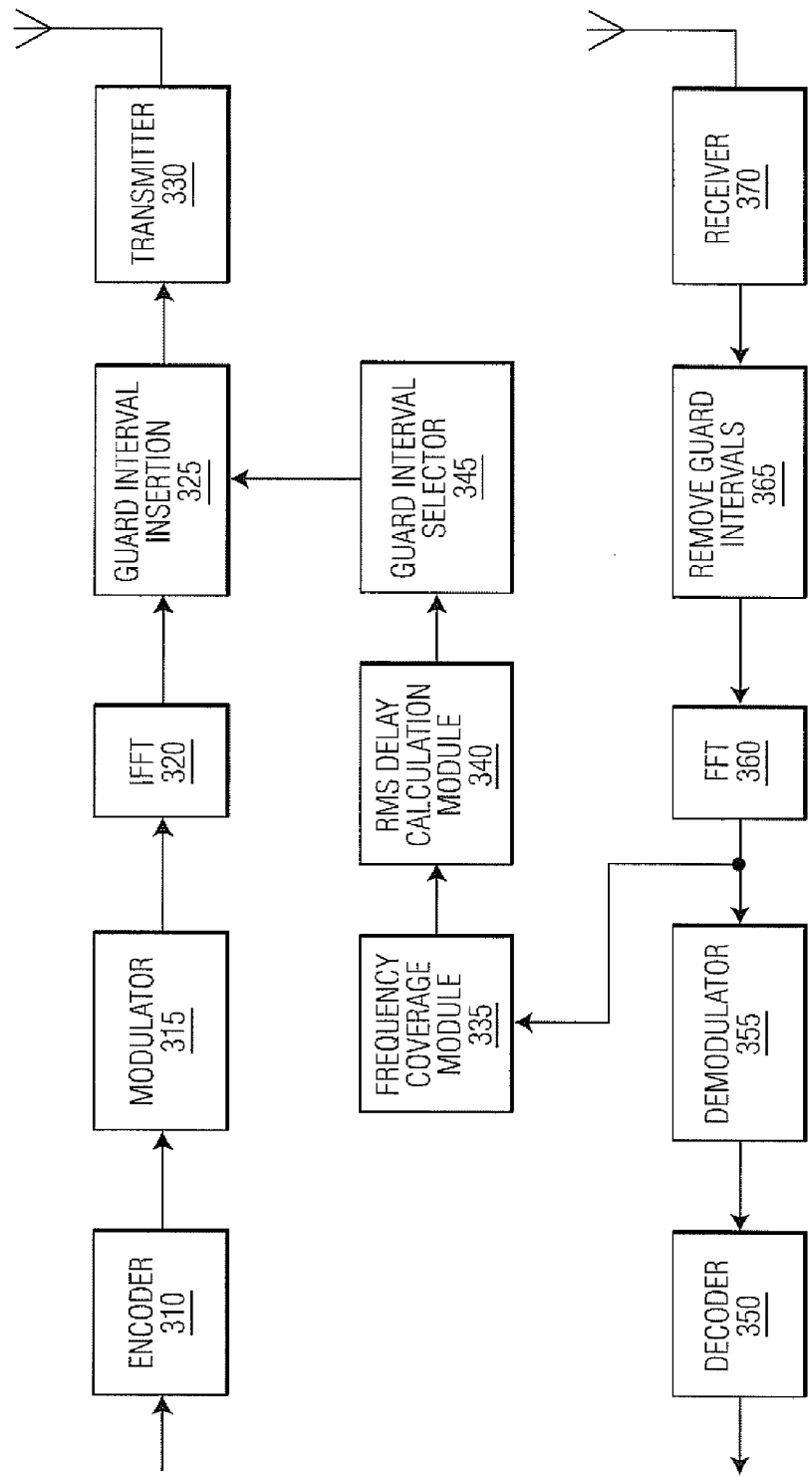
FIG. 3 is an exemplary block diagram of an orthogonal frequency division multiplexing system according to one embodiment of the invention.

FIG. 3 illustrates an OFDM system in which a guard interval length is selected and inserted into a signal according to one embodiment of the invention. A receiver 370 receives an OFDM signal and removes guard intervals 365 within the signal. An FFT module 360 converts the signal into the frequency domain. Thereafter, the frequency domain signal is demodulated by a demodulator 355 and decoded by a decoder 350. Other devices and components may also be included within the receiver data path.

A frequency covariance module 335 receives a frequency domain signal from the receiver data path. In one embodiment, the frequency covariance module 335 receives the frequency domain signal after the FFT module 360 and prior to demodulation. The frequency covariance module 335 identifies frequency correlation within the signal using a covariance function. This correlation is subsequently used to derive a coherence bandwidth for the signal. An RMS delay calculation module 340 estimates an RMS delay associated with the derived coherence bandwidth. Thereafter, a minimum guard interval length is selected by the guard interval selector 345 using the estimated RMS delay of the signal. This selection of a minimum guard interval length is described in more detail below.

A transmit data path is illustrated in which an encoder 310 encodes data within the frequency domain and a modulator 315 modulates the data onto a signal. An IFFT module 320 converts the modulated frequency domain signal into the time domain. A guard interval insertion module 325 inserts guard intervals between symbols within the signal to prevent smearing of data within the time domain. The guard interval insertion module 325 interfaces with the guard interval selector 345 to identify a minimum guard interval length that must be inserted. In various embodiments of the invention, the guard interval insertion module 325 may use different guard interval lengths that are greater than the identified minimum guard interval length. For example, a standard may define multiple guard interval lengths that may be added to the signal and the guard interval insertion module 325 may select a preferred guard interval length relative to this standard and the identified minimum guard interval length. Thereafter, a transmitter 330 transmits the OFDM signal to a corresponding receiver.

B. Guard Interval Length Identification

Figure 4:
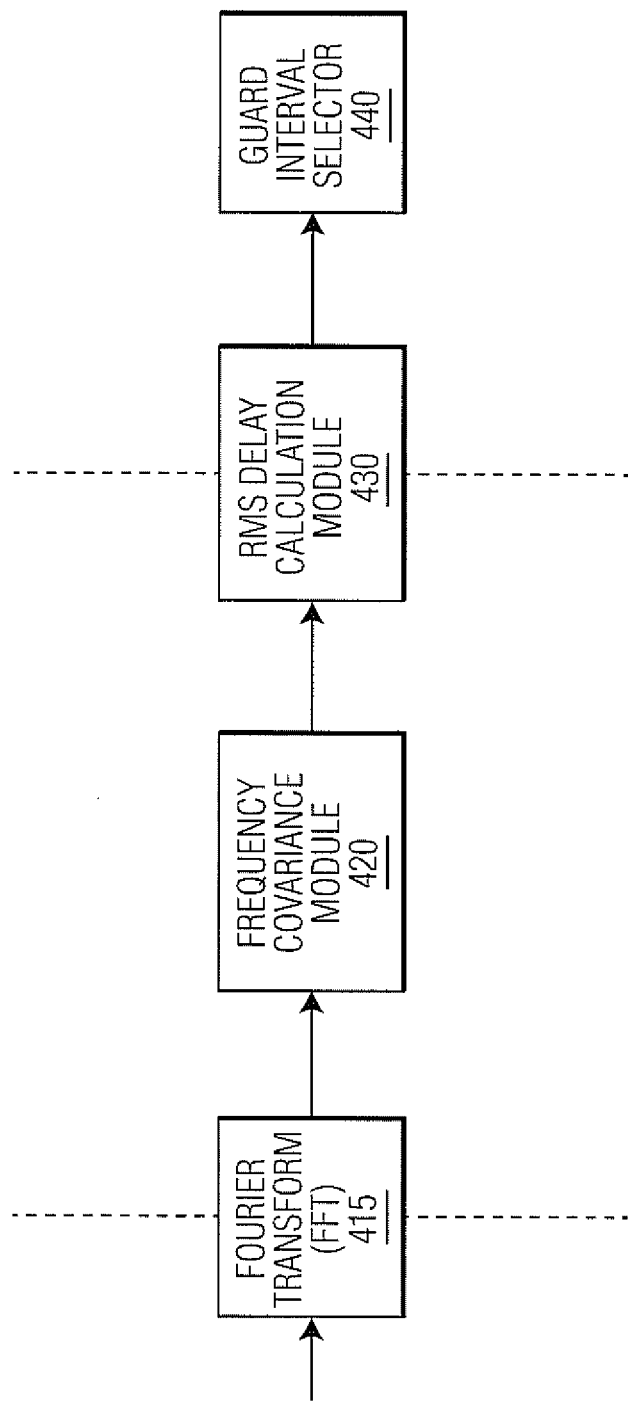
FIG. 4 is a block diagram of an apparatus that selects a guard interval length according to one embodiment of the invention.

FIG. 4 is a block diagram of a guard interval length identifier according to one embodiment of the invention. An appropriate guard interval length is identified based on an analysis of channel frequency correlations, coherence bandwidth and RMS delay. This analysis may be performed at an OFDM transmitter or receiver.

As described above, an OFDM signal is received, which is in the time domain. Using a Fourier Transform 415, the OFDM signal is converted into the frequency domain. In this particular example, the analysis of the signal's frequency correlation is less resource intensive when performed in the frequency domain as compared to the time domain. Various types of components, well known in the art, may be used to transform the signal from the time domain to the frequency domain.

Figure 5A:
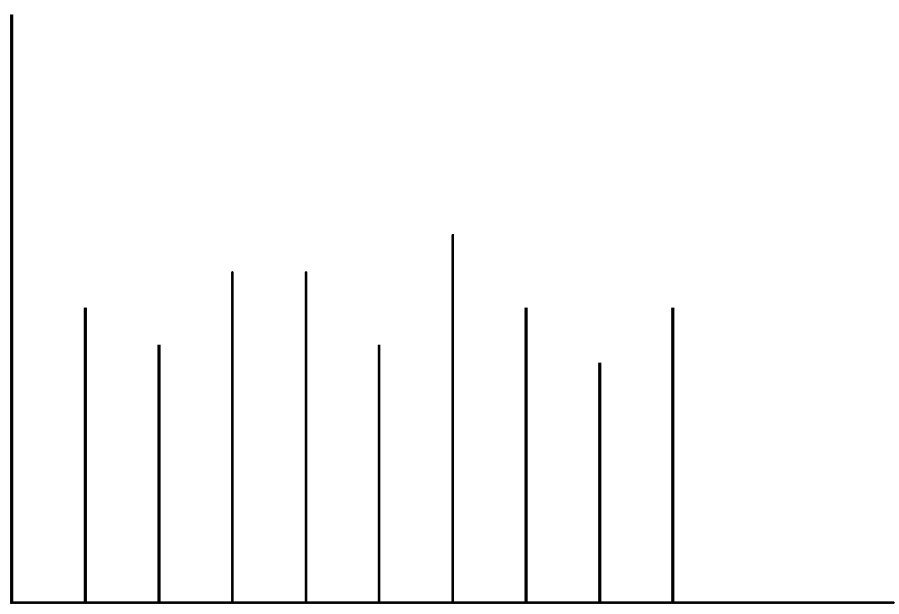
FIG. 5A is an exemplary plot illustrating carrier frequencies within an OFDM channel according to one embodiment of the invention.

A frequency covariance module 420 calculates a frequency covariance function of the incoming OFDM signal. The OFDM signal may be represented in the frequency domain as:

$$Y = \sum_{n=1}^{N} X_n$$

where N is the number of frequency tones and X is the narrowband signals in the OFDM signal. This OFDM signal in the frequency domain may be graphically represented by the exemplary subcarrier index plot illustrated in FIG. 5A. In this illustration, a plurality of frequencies is shown, each having a particular amplitude. Each of these frequencies operates as a carrier within the OFDM channel and is modulated to contain data. Various modulation techniques may be performed such as quadrature amplitude modulation ("QAM") or binary phase shift keying ("BPSK").

The correlation between each of these frequencies may be used to identify particular characteristics of the OFDM channel and a corresponding relationship to a minimum length of a guard interval used therein. In particular, the frequency covariance module 420 calculates a covariance function according to:

$$C(m) = \frac{1}{N-m} \sum_{n=1}^{N-m} X_n X_{n+m}$$

where C(m) statistically measures a relationship between two frequencies within the OFDM channel. This covariance function may be used to define a correlation function for the OFDM channel according to:

$$R(m) = \left| \frac{C(m)}{C(0)} \right|$$

where R(m) is a statistical measure of the frequency relationships bounded between the range of 1 and 0.

Figure 5B:
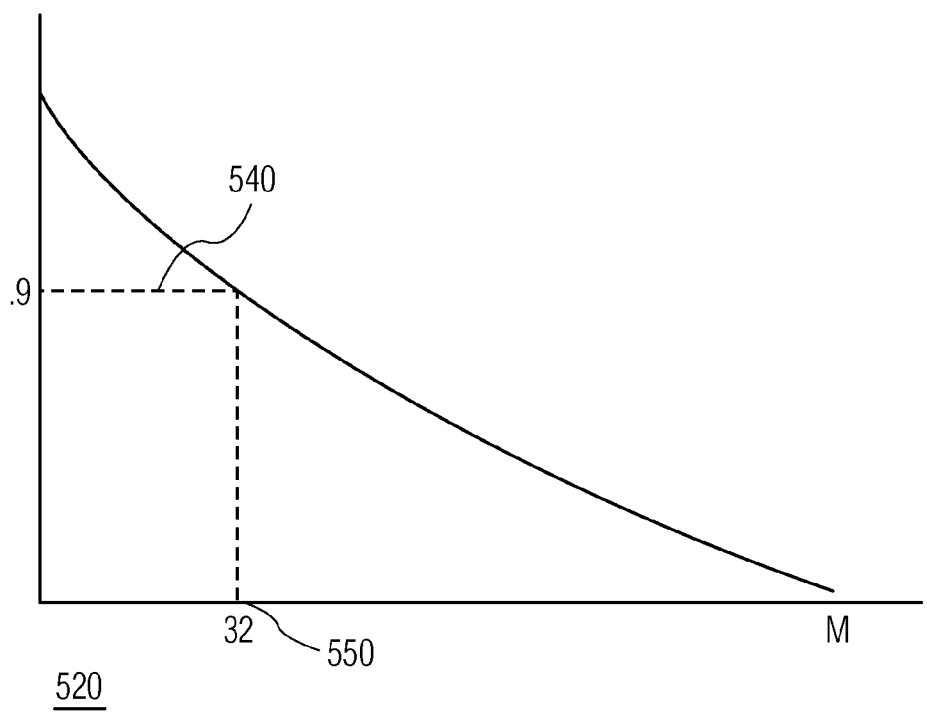
FIG. 5B is an exemplary frequency covariance function chart for the OFDM channel according to one embodiment of the invention.

FIG. 5B illustrates an exemplary frequency covariance function graph according to one embodiment of the invention. The frequency covariance function provides discrete covariance values for integer N values. In one embodiment of the invention, this frequency covariance is bounded between 1 and 0 where 1 means a perfect correlation and 0 means no correlation. One skilled in the art will recognize that various frequency correlation functions and graphs may be generated from the covariance function; all of which are intended to fall within the scope of the present invention.

The frequency covariance module 420 applies a threshold value 540 to the frequency correlation function in order to identify an appropriate coherence bandwidth 550. The coherence bandwidth describes a range of frequencies in which the OFDM channel passes its spectral components with equal gain and linear phase.

In one embodiment of the invention, the threshold value 540 may be defined as 0.9 and is applied to the correlation function R(m). In this embodiment, the value of M is found and defined as the range of frequencies over which the frequency correlation is greater to or equal to 0.9 according to the frequency correlation function R(m). For example, if 0.9 is applied, then a particular R(m) value, such as a value of 32, is identified. From 802.11a, the total bandwidth may be defined as 20 MHz and the largest M value may be defined as 64. Using this information, the coherence bandwidth ($B_C$) may be defined as:

(32/64)×20 MHz=10 MHz

In such a scenario, the coherence bandwidth of 10 MHz would relate to 90% or greater frequency correlation. One skilled in the art will recognize that the applied threshold may range from 0 to 1 if a normalized correlation function is used or may be over any range depending on the characteristics of the particular correlation function.

An RMS delay calculation module 430 calculates an RMS delay associated with the identified coherence bandwidth. This calculation effectively converts subsequent signal processing from the frequency domain into the time domain. RMS delay is derived from the OFDM channel impulse response and represents the amplitude and time delay of a multi-path signals. An RMS delay ($D_R$) is inversely proportional to a signal's coherence bandwidth such that:

$$D_R = X/B_C$$

where $B_C$ is the coherence bandwidth, is the signal's corresponding RMS delay and X is a scaling factor.

Using this relationship, the RMS delay calculation module 430 is able to derive RMS delay for an OFDM channel from its previously selected coherence bandwidth. In particular, a statistical relationship (including the scaling factor X) may be used to estimate the RMS delay from the calculated coherence bandwidth. For example, in the above-described example wherein a 10 MHz coherence bandwidth is calculated, X is equal to 5 resulting in an estimation of 0.5 μs for the corresponding RMS delay. One skilled in the art will recognize that various methods may be used to relate coherence bandwidth to RMS delay, all of which are intended to fall within the scope of the present invention. One such description of the relationship between RMS delay and coherence bandwidth is provided in "Mobile Radio Communications" Steele, R., IEEE Press (1994).

A guard interval selector 440 selects an appropriate guard interval length based on the calculated RMS delay. Because the RMS delay is derived from the OFDM channel impulse response, an appropriate guard interval length may be determined from RMS delay to compensate for multi-path effects within the channel.

As described above, a guard interval protects against symbol smearing within the time domain. As the RMS delay spread increases, the amount of signal fading more widely fluctuates between frequencies requiring a longer guard interval.

In one embodiment of the invention, a minimum length for the guard interval is set such that the RMS delay spread is smaller than the guard interval length. In particular, an analysis of an OFDM channel RMS delay may be performed in order to identify the amount of delay caused by multi-path signals and to select an appropriate guard interval length that addresses this multi-path distortion.

The selection of the guard interval length may also depend on other factors. For example, there may be predefined lengths for a guard interval. The proposed IEEE 802.11n may define a plurality of possible guard interval lengths that may be selected for use within an OFDM channel. According to suggestions for this future standard, guard interval lengths of 0.8 μs or 0.4 μs may be selected. In the above-described example, the RMS delay was approximated to be 0.5 μs. In this scenario, the 0.8 μs guard interval length would be selected because the 0.4 μs guard interval length is smaller than the approximated RMS delay.

In one embodiment, the calculations and selection of a guard interval length may be performed at a receiver and provided to a transmitter. In another embodiment, the transmitter may assume channel reciprocity in a time division duplex ("TDD") system and select the guard interval length.

The selection of the guard interval length may be performed at both devices of a wireless communication. In a different embodiment, the calculations and selection of a guard interval is performed on one of the devices in a wireless communication and the other device derives the guard interval length from the signal it receives on the wireless channel. In particular, a device receiving an OFDM signal may analyze the length of the guard interval it received and apply that guard interval length to its transmissions on the OFDM channel.

C. Method of Selecting a Guard Interval Length

Figure 6:
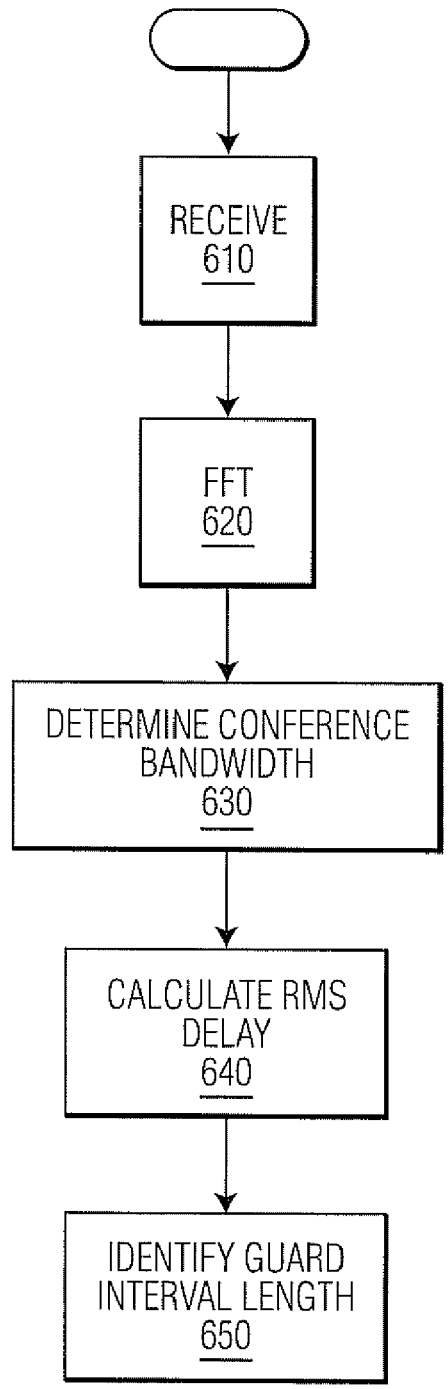
FIG. 6 is a flowchart illustrating a method for determining a guard interval length according to one embodiment of the invention.

FIG. 6 illustrates a method for selecting a guard interval length, independent of structure, according to one embodiment of the invention. A wireless device receives 610 an OFDM signal and transforms 620 the signal into the frequency domain. One method in which the transformation may be performed is by applying a Fourier Transform on the signal.

A coherence bandwidth is determined 630 for the OFDM signal. In one embodiment, the coherence bandwidth may be determined using frequency correlation characteristics within the OFDM signal. A RMS delay 640 is calculated using the determined coherence bandwidth, which effectively converts the signal processing thereafter into the time domain. The RMS delay is inversely proportional to the coherence bandwidth and may be statistically estimated therefrom. A scaling factor may be necessary in this estimation.

A guard interval length is identified 650 using the RMS delay. In particular, a minimum guard interval length is determined according to the signal RMS delay. Thereafter, an appropriate guard interval length above this minimum length is selected and used within the OFDM channel.

While the present invention has been described with reference to certain embodiments, those skilled in the art will recognize that various modifications may be provided. Variations upon and modifications to the embodiments are provided for by the present invention, which is limited only by the following claims.

The invention claimed is:

1. An apparatus for selecting a guard interval length for a multi-path channel, the apparatus comprising:
    an antenna interface, coupled to receive and transmit a signal, to an antenna;
    a frequency covariance module, coupled to receive the signal in the frequency domain, that identifies a coherence bandwidth of the signal;
    a Root Mean Square (RMS) delay calculation module, coupled to communicate with the frequency covariance module, that estimates an RMS delay associated with the coherence bandwidth of the signal; and
    a guard interval selector, coupled to communicate with the RMS delay calculation module, that selects the guard interval length based on an analysis of channel frequency correlations, coherence bandwidth, and the RMS delay of the signal.

2. The apparatus of claim 1, wherein the signal is converted into the frequency domain using a Fourier Transform.

3. The apparatus of claim 1, wherein the frequency covariance module uses a covariance function in order to identify a relationship between channel carrier frequencies and corresponding amplitudes.

4. The apparatus of claim 3, wherein the frequency covariance module identifies the coherence bandwidth by applying a threshold between 1 and 0 to the covariance function.

5. The apparatus of claim 4, wherein the coherence bandwidth is selected at 0.9 and defines a frequency bandwidth.

6. The apparatus of claim 4, wherein the RMS delay calculation module identifies an RMS delay associated with the identified coherence bandwidth.

7. The apparatus of claim 6, wherein the RMS delay and the identified coherence bandwidth are inversely proportional to each other and related by a scaling factor.

8. The apparatus of claim 1, wherein the apparatus is located in a wireless receiver and the guard interval length is provided to a transmitter via a feedback connection.

9. The apparatus of claim 1, wherein the apparatus is located in a wireless transmitter and selects the guard interval length by assuming channel reciprocity in a time division duplex system in which the transmitter is operating.

10. A method for selecting a length of a guard interval within a wireless channel, the method comprising:
    receiving a multi-path signal;
    transforming the multi-path signal from a time domain to a frequency domain;
    determining a coherence bandwidth for the multi-path signal using correlation between frequencies within the signal;
    calculating a Root Mean Square (RMS) delay within the time domain using the determined coherence bandwidth; and
    identifying a guard interval length for a multi-path communication channel based on an analysis of channel frequency correlations, coherence bandwidth, and the calculated RMS delay.

11. The method of claim 10, wherein the multi-path signal is an orthogonal frequency division multiplexed signal.

12. The method of claim 10, further comprising:
    calculating a covariance function for the multi-path signal that describes the frequencies and corresponding amplitude therein.

13. The method of claim 12, further comprising:
    deriving a frequency correlation function from the covariance function; and
    determining the covariance bandwidth by applying a 90 percent threshold to the derived frequency correlation function.

14. The method of claim 13, wherein the RMS delay is inversely proportional to the covariance bandwidth and related by a scaling factor of 5.

15. The method of claim 10, further comprising:
    selecting the guard interval length to be longer than a minimum guard interval length derived from the RMS delay.

16. The method of claim 10, further comprising:
    using different guard interval lengths that are greater than the identified guard interval length.

17. The method of claim 10, further comprising:
    selecting a preferred guard interval length relative to both a standard and the identified guard interval length.

18. The method of claim 10, further comprising:
    selecting a guard interval of either 0.8 μs or 0.4 μs.

* * * * *